United States Patent [19]

Knepp et al.

[11] 4,198,175
[45] Apr. 15, 1980

[54] TIMBER CONNECTORS

[75] Inventors: Wayne A. Knepp, Morton; David A. Fehr, Roanoke, both of Ill.

[73] Assignee: Morton Buildings, Inc., Morton, Ill.

[21] Appl. No.: 948,159

[22] Filed: Oct. 3, 1978

[51] Int. Cl.² ............................................. F16B 7/00
[52] U.S. Cl. .................................. 403/191; 52/289; 52/702; 403/232.1; 85/11
[58] Field of Search ................... 403/231, 232.1, 405, 403/406, 191; 248/DIG. 9; 85/11, 13; 52/289

[56] References Cited

U.S. PATENT DOCUMENTS

| | | | |
|---|---|---|---|
| 1,807,186 | 5/1931 | Warner | 403/405 X |
| 2,911,690 | 11/1959 | Sanford | 403/232.1 |
| 3,211,043 | 10/1965 | Sanford | 403/405 X |
| 3,304,106 | 2/1967 | McCormack | 85/13 X |
| 3,703,304 | 11/1972 | Losee | 85/13 X |

FOREIGN PATENT DOCUMENTS 185694  9/1922  United Kingdom ................ 403/232.1

*Primary Examiner*—Wayne L. Shedd
*Attorney, Agent, or Firm*—Hill, Van Santen, Steadman, Chiara & Simpson

[57] ABSTRACT

Timber connectors in the form of initially flat plates each having a portion containing a plurality of apertures with at least one tooth or barb or a series of teeth struck from the plate and turned inwardly from the bounding edge of each aperture, and a portion devoid of teeth but containing a row or rows of spaced aligned holes for fastening means in the form of a preferred type of nails or other suitable fastener as desired. The aforesaid aligned holes provide lines of weakness whereby part of the connector can be bent on the job site for engagement with a main supporting timber. The connectors can be supplied on the ends of timbers by a power press at the plant pressing the teeth into a timber, and shipped to the job site in strapped bundles as lumber is usually shipped.

15 Claims, 10 Drawing Figures

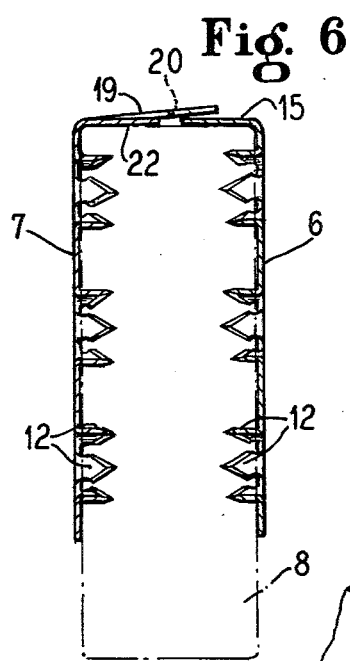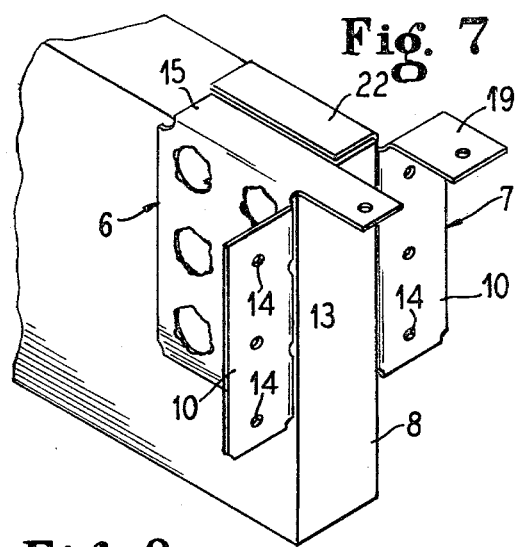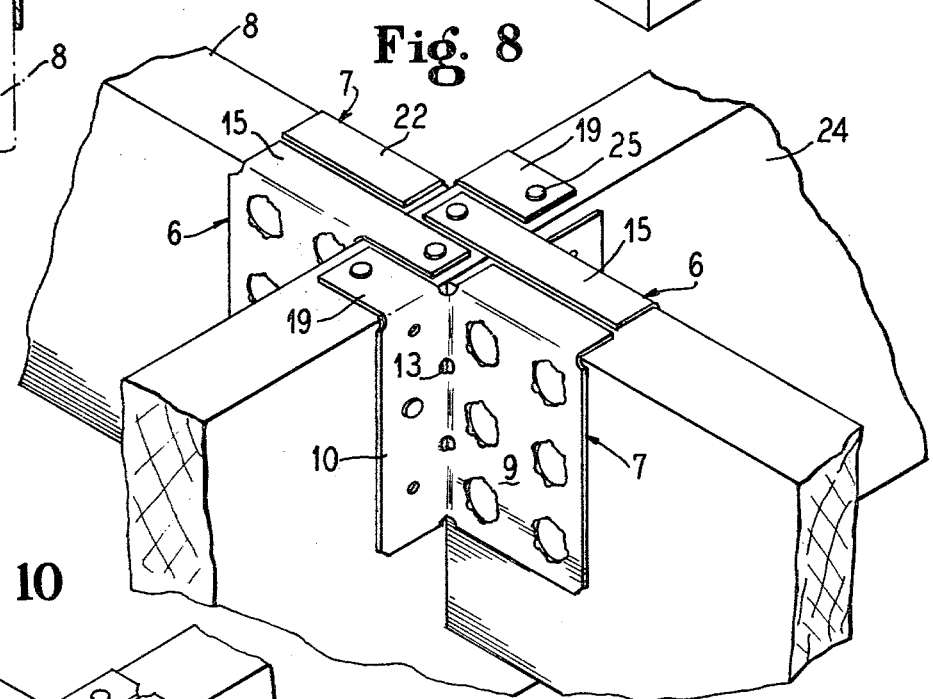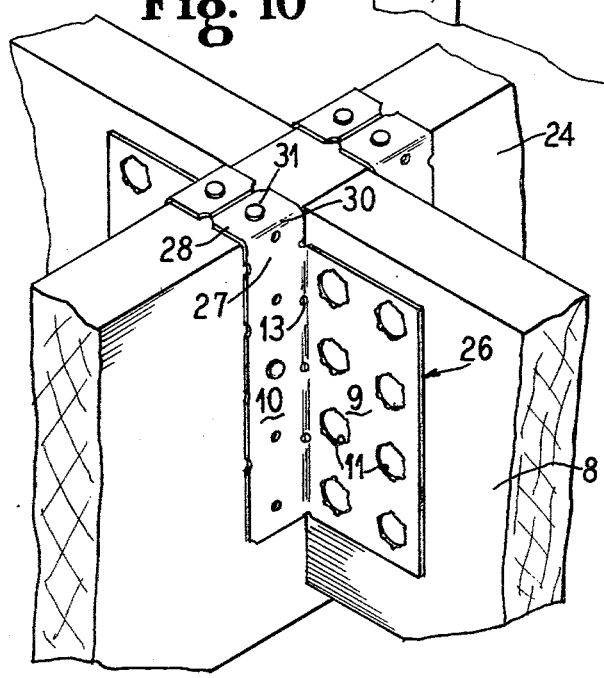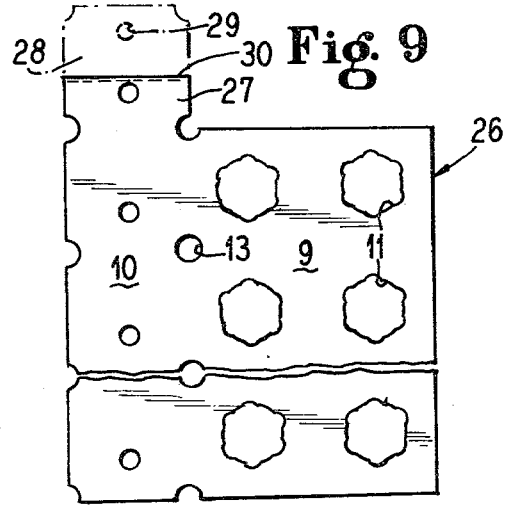

TIMBER CONNECTORS

BRIEF SUMMARY OF THE INVENTION

This invention relates to timber connectors for fastening wooden members or timbers such as purlins, joists, or girts to a supporting framework of wood, steel, or other structural materials. The timber connectors are usable in residential, commercial, industrial, or farm buildings.

Each connector is stamped from a metal sheet. One portion of the stamped out connector has a plurality of apertures punched therethrough, each aperture having one or more teeth or barbs which are ultimately pressed into a purlin, joist, etc. by a power press at the main plant or factory. The number of such apertures with teeth may be varied dependent upon the load to be carried. The other portion of the stamped connector contains apertures to be used for fastening means of any kind desired, and also a row of apertures to provide a weakened line therethrough so that an accurate 90° bend may be made in that portion of the connector at the job site, this being the only bend in the connector made at the job site. All other bends such as a 90° lip and a 90° flange or leg are made at the factory, which is far more economical and less dangerous to an operator than making all bends at the job site.

When a connection is made with a main supporting member, two connectors are utilized on opposite sides of the piece being mounted, such as a purlin, joist, or some other timber that must be attached at the job site. These two connectors need not be mirror images of each other although that is also possible when different loading conditions exist. All in all, the connectors embodied in the instant invention are economical to make and may be attached to purlins, joists, and the like at the factory. Then the timbers may be stacked and bound together in bundles as lumber is most usually shipped with connectors attached at both ends, no special packing is necessary and the connectors carried by the lumber will not be damaged during transport. It should also be noted that upon arrival at the job site, the timbers bearing the connectors may be fairly easily and safely placed in position, and the workers will spend much less time in a dangerous or unbalanced working position.

BRIEF DESCRIPTION OF THE DRAWINGS

FIG. 2 is a side elevational view of one of the connectors embodying principles of this invention showing the same secured to a timber, such as a purlin, joist, or the like;

FIG. 6 is a vertical sectional view taken substantially as indicated by the line VI—VI of FIG. 4 showing the teeth of the connectors pressed into the body of the piece being mounted;

FIG. 7 is a fragmentary somewhat end view of the structure of FIG. 2 with a 90° flange bent outwardly on each of the connectors;

FIG. 8 is a fragmentary somewhat plan view of a central main support to which timbers are connected to each side by means of connectors embodying the instant invention;

FIG. 9 is a fragmentary elevational view of a connector of somewhat different construction than the others shown in the drawings; and FIG. 10 is a fragmentary view of the character of FIG. 8 but utilizing the connector of FIG. 9 with another connector on the opposite side of the piece being mounted that is a mirror image of that of FIG. 9.

DETAILED DESCRIPTION

The instant invention embodies clips or connectors used in pairs to connect wooden members or timbers such as purlins, joists, girts, inter alia, to a supporting framework of wood, steel or other structural materials. Therefore, by way of example and not by way of limitation, we have shown in FIG. 1 a roof under construction which may be a roof for a residential, commercial, industrial, or farm building. Accordingly in this example there would be wood-to-wood connections made.

Figure 1:
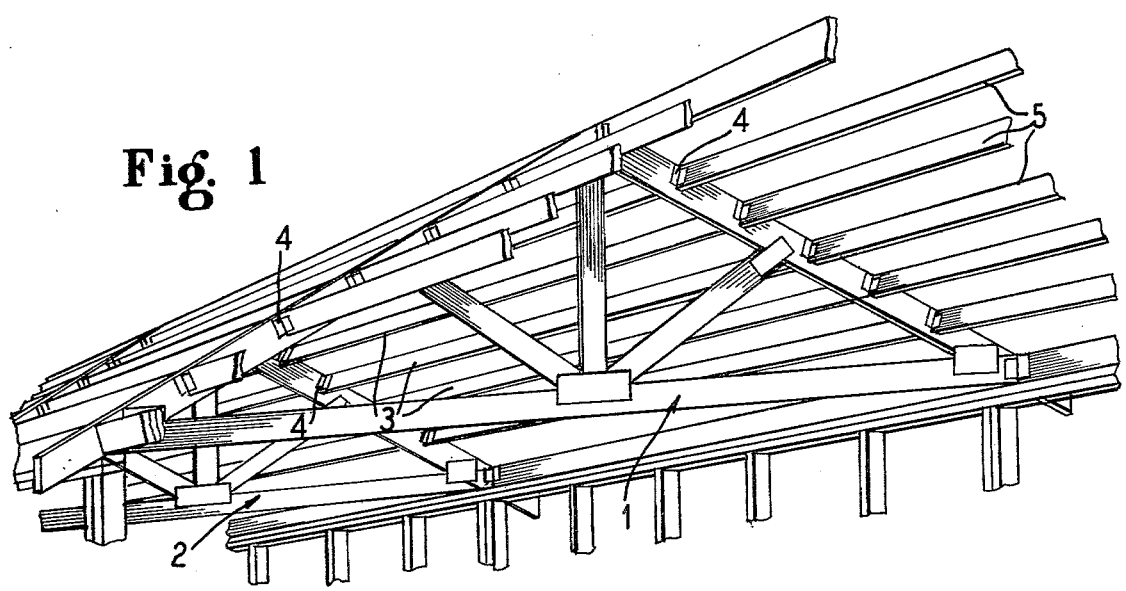
FIG. 1 is a fragmentary projectional view of a roof structure, not yet completed, looking up from below.

In the showing of FIG. 1, the supporting structural framework includes a roof truss generally indicated by numeral 1, and a second roof truss generally indicated by numeral 2 spaced from the truss 1. In the illustrated instance, purlins 3 would be attached at one end to the rafters of truss 2 and at the other end to the rafters of truss 1 in order to provide a foundation for roofing. These purlins are held in place by connectors 4 embodying principles of the instant invention. These connectors are not shown in detail but merely indicated in FIG. 1. In the same manner, purlins 5 would be connected from truss 1 to another truss spaced therefrom, not shown in the drawing.

Figure 2:
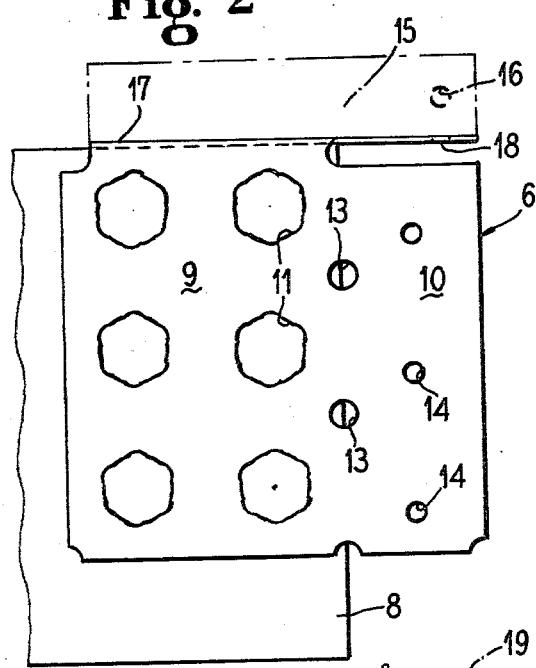
Figure 3:
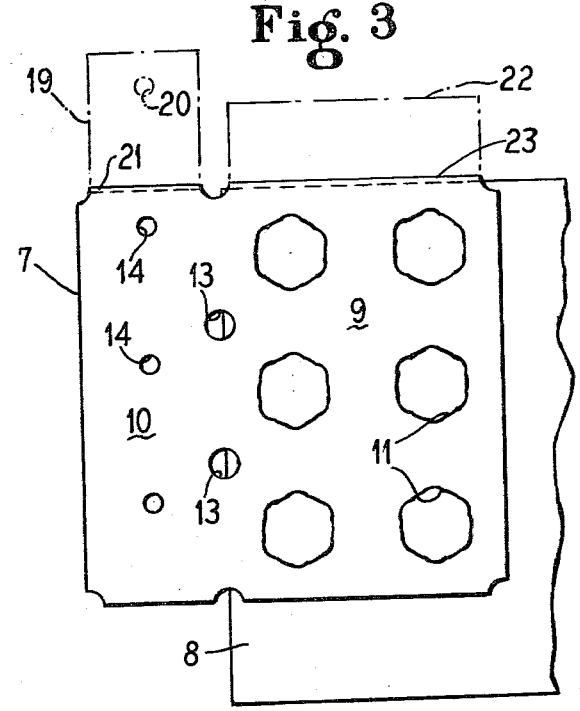
FIG. 3 is a view of the slightly different connector embodying principles of this invention mounted on the opposite side of the timber being connected.
Figure 4:
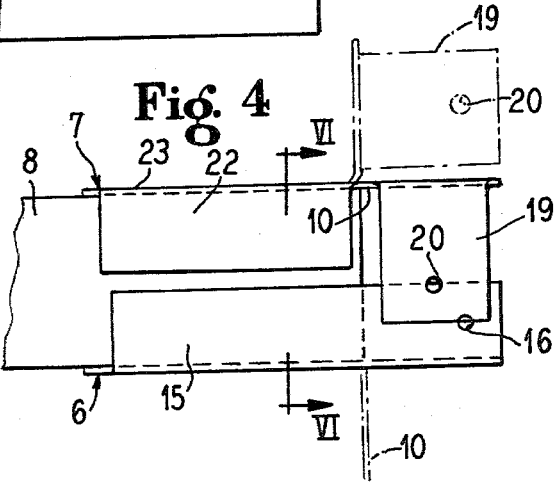
FIG. 4 is a fragmentary top plan view of the showing in FIG. 2.

While the instant invention is herein described as connectors for purlins, it will be understood that joists, girts, and other timbers may be connected to main supporting members in the same way as purlins are connected. The connectors are used in pairs, one on one side of a purlin and the other directly opposite on the other side. In the preferred form of this invention the pair of connectors are not mirror images of each other. In FIGS. 2 and 3 we has shown a pair of connectors 6 and 7 engaged to the same purlin 8 but on opposite sides of an end thereof. Each of these connectors is stamped from a sheet of metal, preferably galvanized steel. Each of the connectors 6 and 7 have body portions 9 and 10. The body portion 9 of each connector is provided with a plurality of punched apertures 11 each of which is shown bounded by a plurality of teeth or barbs 12, as seen best in FIG. 6. These teeth extend inwardly and are cut and bent at the time the holes are punched. The size and shape of the holes and the number of teeth as well as the shape of the teeth are not essential, there are a number of sizes of teeth that might be desired and the size of the hole must be sufficiently large to accommodate any desired number of teeth. Whether or not these teeth are barbed as shown in FIG. 6 is dependent upon the desire of the user. The total number of teeth as well as the overall connector dimensions are determined by the loads to be carried. Between the portion 9 of the body of each connector 6, 7 and the portion 10 is bend-facilitating deformation means comprising, for example, a row of holes 13. These are provided so as to form a line of weakness along the line running centrally through the holes so that the portion 10 may be bent in the field substantially accurately at 90° to the body portion 9 of the connector in a straight line. Extending centrally through the portion 10 is another row (or rows) of holes 14, also in a straight line, and these holes are sized and spaced to accommodate fastening means such as certain types of nails, screw fasteners, or bolts as may be desired. The particular type, size and number of fasteners depends on the type of material used in the supporting framework and the loads to be carried.

Connector 6, as indicated by the dotted line showing in FIG. 2, is provided with a prebent flange 15 extending the full length of the body 9, 10 and having an aperture 16 in the leading end portion thereof. This flange 15 has been bent at substantially a 90° angle to the body of the connector as indicated at 17 so that the flange 15 overlies the top edge of the purlin 8. The bending of the flange 15 is done at the main plant or factory. There is a slot 18 between the projecting portion of the flange 15 and the connector body portion 10 to permit the lateral outward wing-like bending of the portion 10 of the body of the connector which bend is made, at the job site, along the bend line defined by the deformation means holes 13.

The connector 7 has the body portion 10 provided with a prebent flange 19 having an aperture 20 therein and which is bent at near right angles or substantially 95° to the body of the connector as indicated at 21. This connector also has a flange 22 bent substantially 90° to the body portion 9 as indicated at 23. Both the bends 21 and 23 are done at the main plant or factory. The flange 22 overlies the upper edge of the purlin 8, while the flange 19 is disposed beyond the end of the purlin and will overlie the upper edge of the main supporting timber to which the purlin is connected. At the job site, the portion 10 of the body is bent outwardly away from the purlin 8 to provide a lateral wing adapted to be secured to the side of the supporting member 24.

Figure 5:
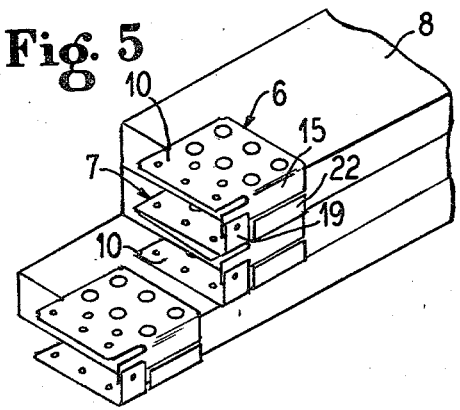
FIG. 5 is a fragmentary view showing how the lumber may be stacked and ultimately bound into bundles with the connectors on the ends of each timber.

It will be noted that there is only one bend per connector to be made at the job site, the other bends being made at the main plant or factory. Leaving that one bend per connector to be made at the job site, permits both connectors to be attached to the purlin 8 at the factory with the idea of permanent connection being in mind. The portions 9 of the connectors 6 and 7 may be pressed with power means so that the teeth or barbs 12 will be pushed into the wood of the purlin 8 as seen in FIG. 6. That is the only connection with the purlin that a connector need have. This results in a connection at each end of a purlin with the flange 15 of the connector 6 overlying and extending beyond the end of the purlin, and the flange 22 and flange 19 on the connector 7 are bent inwardly for the flange 22 to overlie the upper edge of the purlin and the flange 19 initially overlying the projecting portion of the flange 15 beyond the end of the purlin in a mutually protective relation. Such arrangement results in a considerable saving. Leaving the one bend per connector to be done at the job site, permits the purlins to be stacked and bundled in the manner lumber is usually transported. The connectors 6 and 7 are permanently on the purlins, and all projecting parts thereof extend straight out from the ends thereof substantially coplanar with the longitudinal surfaces of the purlin from which such parts project, as seen in FIG. 5 and will not be injured in a bound bundle of purlins or other timbers to be mounted in the same fashion.

When a bundle of purlins with connectors attached at the ends thereof arrives at the job site, the portion 10 of each connector is bent outwardly so as to extend substantially flush with the end of each purlin, which results in the arrangement seen in FIG. 7. This job site bending may be accomplished with a pair of pliers having wide jaws or any other suitable device. This automatically moves the flange 19 into longitudinally projecting relation for overlying the supporting structure. However, both of the flanges 15 and 19 remain in the same plane as applied at the factory.

When the purlin equipped with the connectors and job-site-bent wing flange forming, substantially purlin-end-flush portions 10—10 thereof is placed endwise against a face of a main supporting member 24 which may be one of the rafters of the roof trusses of FIG. 1, the projecting portion of the flange 15 will of the connector 6 will overlie the upper edge of the supporting member 24 and the flange 19 of the connector 7 will also overlie the upper edge of the supporting member 24, in supporting and position orienting relation as seen clearly in FIG. 8. The flanges 15 and 19 may be secured to the upper edge of the supporting member 24 by driving fastening elements 25 through the apertures in such flanges and into the edge of the timber 24. This can be done quickly and easily and the purlin is supported, and it is a very simple expedient to drive more fasteners 25 through the laterally projecting wings 10—10 of the pair of connectors into the face of the timber 24. The projecting flanges and the wing portions of the pair of connectors at the end of a purlin will serve to quickly and easily position the purlin in proper place and when these portions are fastened down by the fasteners 25 an extremely strong connection results. Such a connection adds greatly to the longitudinal tensile strength of the connection.

Should there be a purlin connected in alignment with both sides of the support member 24, as shown in FIG. 8, it will be noted that the flanges 15 and the extensions of the flanges 19 are interdigitated, whereby the flange 19 of one connector alternates with the flange 15 of a connector on the opposite side, and the flange 15 of the second connector on the first side extends between the flange 15 and flange 19 of the connectors on the opposite side, thereby providing a staggered formation of the apertures for the fasteners 25, and the likelihood of splitting the main support 24 is virtually eliminated.

In FIGS. 9 and 10 we have shown a different form of connectors which make a weaker tensile connection to a main supporting member 24 than those above described, but which are desirably usable when certain loading conditions are imposed upon the supported timbers. In this instance, the connectors are stamped out of galvanized steel or a sheet of other suitable metal. Each connector 26 has a body portion with an area 9 and an area 10 quite similar to the connectors above described. However, the area 10 on the connector 26 has a neck 27 extending upwardly with a flange 28 thereon which is ultimately bent at substantially right angles to the neck 27 as indicated at 30. The flange is provided with an aperture 29 for a fastening element 31 and the flange overlies the upper edge of the main supporting timber 24. Everything else is substantially the same as previously described with a notable exception that in this instance, the pair of connectors on the end of a purlin are mirror images of each other.

Only one bend on each connector, along the row of apertures 13 which places the portion 10 at approximately 90° to the portion 9 need be made at the job site. The bend of the flange 28 at approximately 90° to the neck 27 on each connector may be made at the factory so these flanges will approximately touch in extending position toward one another in mutually protective relation beyond the upper edge of the purlin. When the portion 10 is bent at the job site, the flange travels with it into position to overlie the main support 24. This, of course, facilitates shipping and handling of the purlins. In the unbent condition of the portions 10, the lumber with connectors attached can be stacked and bundled like regular lumber without damage to the connectors and without needing any special packaging. The style shown in FIGS. 9 and 10 can also be made without the neck 27. This style is desirable when the top surfaces of the supported and supporting members are not flush. All of the present connectors mentioned can be made in various sizes and material thicknesses to fit various timber sizes and load requirements.

With the present invention greater strength is achieved at lower cost than other types of purlin and joist hangers, especially those purlin and joist hangers which have to be transported loose and in a special container and which must be attached to both the supporting and supported timbers at the job site. Anchoring or completely connecting the connectors to the purlin or joist at the factory effects a considerable time saving over attaching the connectors to the purlins at the job site. Also, it should be noted that a purlin or joist with connectors completely attached at both ends can still be handled like an ordinary timber with no connectors on, and handled in that manner without any danger of dropping the connectors.

The instant invention increases worker's safety since the worker spends less time in dangerous positions, and the fastener holes in the connectors are easily accessible. Often the fastener locations on joist hangers, etc. of the prior art are difficult to reach, due to the particular building construction, thereby tending to put the worker in an unbalanced working posture for a much longer time than is necessary with the present invention.

We claim:

1. A timber having opposite side surfaces, a top surface, and an end adapted for connection in assembly with a supporting member in a supporting structural framework in a building under construction, wherein the improvement comprises:
    a pair of connectors each having a first body portion firmly attached to a respective opposite one of said side surfaces adjacent said end of said timber;
    each of said connectors having a second portion extending in a common plane with its first body portion and projecting substantially beyond said end of the timber;
    deformation means providing a line of weakness located between each of said first and second body portions and along which line said second body portion of each connector is adapted to be bent substantially accurately into substantially coplanar relation to the other second body portion at substantially right angles away from the adjacent timber side surface to provide lateral wings adapted to be secured to said supporting structure framework; and
    each of said connectors also having a factory bent downwardly facing supporting flange which remains in substantially the same plane and projects longitudinally beyond said end of said timber for overlying said supporting structure framework in timber-supporting and orienting relation in the assembly;
    whereby said timber may be stacked and bundled with other like timbers and transported to the job site as lumber is usually handled without interference of said connectors with bundling and stacking of the timbers.

2. The timber of claim 1, wherein said first portion of each connector
    has a plurality of apertures, and
    at least one tooth or barb protruding from the bounding edge of each aperture,
    said tooth or barb having been factory pressed into the side faces of said timber, and a like pair of connectors secured in like manner to the opposite end of said timber, and
    said deformation means comprising a row of apertures along said line of weakness, said second portion having apertures therein for fasteners to pass therethrough into said supporting member.

3. A pair of connectors mounted one on each side of an end of a timber which is connected in endwise abutted relation to a side of a supporting member in a structural framework, wherein the improvement comprises:
    each of said connectors having a body part,
    a first portion of each of said body parts having means securing the associated connector to its side of said timber, and a second portion of each connector having apertures therein for fastening means and said second portions extending from said one end of the timber into lateral oppositely extending wing-like position in face-to-face contact with said side of said supporting member,
    one of said connectors also having a flange on the upper edge of its first portion and bent to overlie the top edge of said timber and providing an extension beyond said timber end engaged upon the top edge of said supporting member, with an aperture adjacent one end of said extension for a fastening element,
    the other of said connectors having on the upper edge of its first portion a flange bent to overlie said timber,
    and an apertured flange on the upper edge of the second portion of said other connector bent angularly to project toward and into overlying relation on said supporting member.

4. The connectors and timber and supporting member of claim 3, wherein a second timber having like connectors is similarly connected to the opposite side of said supporting member and in alignment with said first-described timber, and said extensions and apertured flanges of the connectors overlying said supporting member in interdigitated relation and being arranged to provide a staggered disposition of the apertures therein for fastening elements.

5. A connector for connecting a timber to a supporting member in a supporting structural framework, wherein the improvement comprises:
    said connector being a metal stamping, a first portion of which has a plurality of apertures with at least one tooth protruding from the bounding edge of each aperture to be pressed into said timber,
    a second portion bendable at job site from a coplanar relation to said first portion at approximately 90° to said first portion, said portions having therebetween deformation means to provide a line of weakness to facilitate said job site bending, said second portion having an aperture or apertures for fastening means spaced from said line of weakness, and an apertured flange on said second portion permanently prebent to overlie the top face of said supporting member.

6. A connector for connecting a timber endwise to a supporting member in a supporting structural framework, wherein the improvement comprises:

said connector being a metal stamping having a first portion containing a plurality of apertures with one or more teeth protruding from the bounding edge of each aperture to be pressed into the side of said timber adjacent the end of the timber, a second portion of said stamping normally extending in the same plane from the front end of said first portion and connected thereto along a bend line of weakness defined by deformation means to facilitate substantially accurate on site bending of said second portion to extend angularly as a lateral attachment wing from said front end of said first portion and having aperture means for fastening means to secure said second portion to the side of said supporting member, and a flange along an upper edge of said stamping permanently factory bent to overlie the top edge of said timber and having an extension to project in the plane of said flange beyond said end of the timber and engage supportingly on the upper edge of said supporting member, said extension being separated from said second portion so that said second portion can be bent along said line of weakness free from said extension.

7. The connector of claim 6, wherein said extension has at least one aperture therein for fastening means to secure the extension to said supporting member.

8. The timber of claim 1, wherein at least one of said connectors has said factory bent supporting flange on the upper edge of said second portion of said one connector.

9. The timber of claim 1, wherein said factory bent downwardly facing supporting flange comprises an extension from a portion of such flange overlying the top of the timber and remaining in the same plane when said second body portions are bent to provide lateral wings.

10. The timber of claim 1, wherein said downwardly facing supporting flanges comprise a flange on the upper edge of the first portion of one of said connectors and bent to overlie the top edge of said timber and providing an extension beyond said timber end, and the other of said connectors having said downwardly facing supporting flange on the upper edge of its second portion and extending into mutually supportive overlapping relation to said extension while said second portion of said other connector is in the common plane with its first body portion.

11. A method of mounting the timber of claim 1 in assembly with a supporting structure framework, comprising at job site bending said second body portions along said line of weakness in each instance to provide said lateral wings, placing said downwardly facing supporting flanges on said supporting structure in timber-supporting and orienting relation, and securing said lateral wings to said framework.

12. A method of making the timber and connectors of claim 1, which comprises forming said factory bent downwardly facing supporting flange on one of said connectors to lie in part on the top of said timber and to extend in part beyond said end of the timber and in a common plane, and separating said extending part from the second portion of said one connector, so that said second portion of said one connector can be bent into the lateral wing relationship free from said extending part.

13. A method of making the timber and connectors of claim 1, which comprises shaping said downwardly facing supporting flange on one of the connectors as a part along the top of the second portion of said one connector, so that when said second portion of said one connector is bent along said line of weakness into the wing position, said flange part will be automatically moved into position for engaging in timber-supporting and orienting relation on the supporting structure framework.

14. A method of making the timber and connectors of claim 1, which comprises forming said downwardly facing supporting flange on one of said connectors as a dual purpose flange having one part engaging on the top of said timber and a second part extending beyond said end of the timber, separating said extending part from the second portion of said one connector, forming said downwardly facing supporting flange on the other of said connectors as a part along the top of the second portion of said other connector and projecting toward and into mutually supporting relation to said extending part while the second portions of said connectors extend in a common plane with the first body portions of the connectors.

15. A method of making the timber and connectors of claim 1, comprising forming a row of holes to provide said deformation means along said line of weakness of each of said connectors.

* * * * *

UNITED STATES PATENT AND TRADEMARK OFFICE
CERTIFICATE OF CORRECTION

PATENT NO. : 4,198,175
DATED : April 15, 1980
INVENTOR(S) : WAYNE A. KNEPP and DAVID A. FEHR It is certified that error appears in the above—identified patent and that said Letters Patent is hereby corrected as shown below:

```
Col. 2, line 47, for "has" read --have--;
Col. 2, line 51, for "have" read --has--.

Col. 4, line 17, delete "will";
Col. 4, line 21, after "relation" insert a --,--;
Col. 4, line 25, for "edge" read --top edge--;
Col. 4, line 31, for "a" read --the--;
Col. 4, line 60, for "flange" read --flange 28--;
Col. 4, line 62, for "flange" read --flange 28--.

Col. 5, line 7, for "flange" read --flange 28--;
Col. 5, line 17, should start a new paragraph;
Col. 5, line 32, for "on" read --thereon--.
```

Signed and Sealed this

Twenty-second Day of September 1981

[SEAL]

*Attest:*

*Attesting Officer*

GERALD J. MOSSINGHOFF

*Commissioner of Patents and Trademarks*